United States Patent
Tang

(10) Patent No.: US 9,214,808 B2
(45) Date of Patent: Dec. 15, 2015

(54) ELECTRONIC DEVICE AND POWER CONTROL CIRCUIT FOR SAME

(71) Applicant: ShenZhen Treasure City Technology Co., LTD., Shenzhen (CN)

(72) Inventor: Xing-Hua Tang, Shenzhen (CN)

(73) Assignee: ShenZhen Treasure City Technology Co., LTD., ShenZhen (CN)

( * ) Notice: Subject to any disclaimer, the term of this patent is extended or adjusted under 35 U.S.C. 154(b) by 391 days.

(21) Appl. No.: 13/848,681

(22) Filed: Mar. 21, 2013

(65) Prior Publication Data
US 2013/0261816 A1    Oct. 3, 2013

(30) Foreign Application Priority Data
Mar. 28, 2012    (CN) .......................... 2012 1 0084966

(51) Int. Cl.
G06F 19/00    (2011.01)
H02J 1/00    (2006.01)
H02J 7/00    (2006.01)

(52) U.S. Cl.
CPC ... *H02J 1/00* (2013.01); *H02J 7/00* (2013.01); *H02J 2007/0095* (2013.01)

(58) Field of Classification Search
CPC ........ H02J 1/00; H02J 7/00; H02J 2007/0095
USPC ........................................................ 700/286
See application file for complete search history.

(56) References Cited

U.S. PATENT DOCUMENTS

| | | | | |
|---|---|---|---|---|
| 6,208,117 B1* | 3/2001 | Hibi | ...................... | H02J 7/0021 320/134 |
| 2002/0014881 A1* | 2/2002 | Asada | ...................... | H02J 7/16 323/273 |
| 2008/0218127 A1* | 9/2008 | Kao | ...................... | H02J 7/0016 320/134 |
| 2009/0134841 A1* | 5/2009 | Gilmore | ................ | H02J 7/0024 320/118 |
| 2009/0161394 A1* | 6/2009 | Hung | ........................ | G06F 1/26 363/65 |
| 2010/0084918 A1* | 4/2010 | Fells | ...................... | H02J 5/005 307/32 |

OTHER PUBLICATIONS

Raghunathan, V.; Schurgers, C.; Sung Park; Srivastava, M.B., "Energy-aware wireless microsensor networks," in Signal Processing Magazine, IEEE, vol. 19, No. 2, pp. 40-50, Mar. 2002.*

* cited by examiner

*Primary Examiner* — Michael D Masinick
(74) *Attorney, Agent, or Firm* — Novak Druce Connolly Bove + Quigg LLP

(57) ABSTRACT

An electronic device includes a MCU, and a power control circuit. The power control circuit includes a first switch unit connected between a power source and the MCU, and a second switch unit connected between a control terminal of the first switch unit and the MCU. In a first status, the second switch unit outputs a first control signal to switch on the first switch to connect the MCU to the power source for enabling the MCU to receive power; and further outputs a boot signal to the MCU to power the electronic device. Switched to a second status, a shutdown signal is output to the MCU to shutdown the electronic device; and the second switch module further outputs a second control signal to switch off the first switch after a determined time period, to cut power consumption to nil at the end of that period.

10 Claims, 2 Drawing Sheets

ELECTRONIC DEVICE AND POWER CONTROL CIRCUIT FOR SAME

BACKGROUND

1. Technical Field

The present disclosure relates to electronic devices and a power control circuit employed in the electronic devices.

2. Description of Related Art

Energy conservation has become more and more important. In electronic devices using DC power, especially using built-in batteries as the power source, the amount of power consumed at shutdown is one of the most important considerations in manufacturing such electronic devices.

At present, it is common to shutdown electronic devices by MCU using software. However, the MCU of the electronic devices are still connected to the power source and consume energy even when the electronic devices are shut down. Furthermore, once the MCU crashes, user can do nothing but remove the battery to force a shutdown of the electronic device, which may affect software stability and shorten the lifetime of the electronic device.

Therefore, what is needed is an electronic device and a power control circuit to overcome the problems mentioned above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
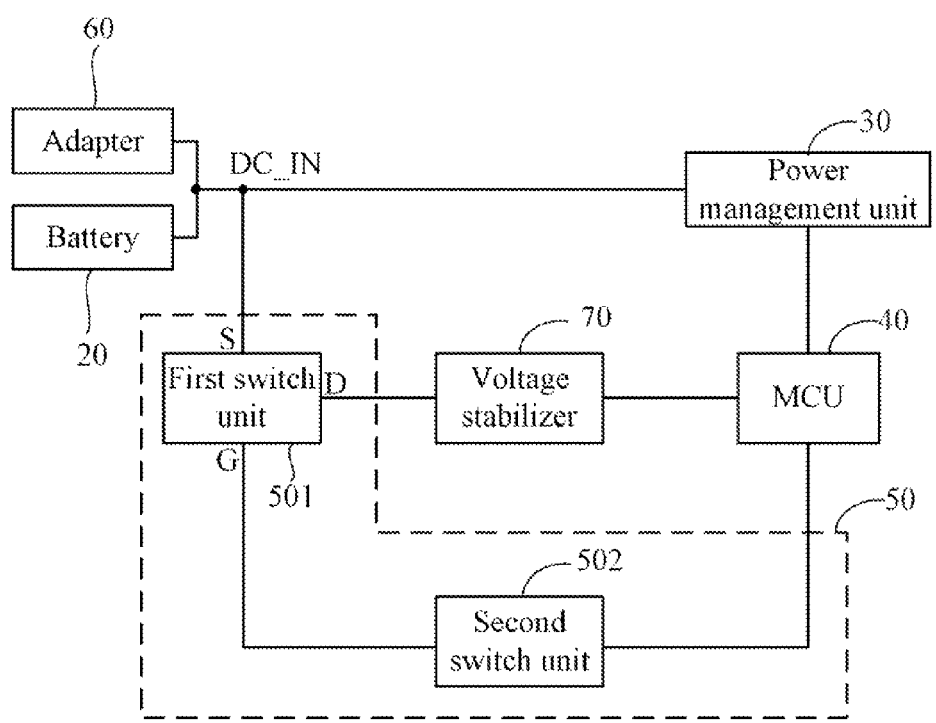
FIG. 1 is a block diagram of an electronic device, according to an embodiment.

Referring to FIG. 1, an electronic device 100 includes a built-in battery 20, a power input port DC_IN, a power management module 30, a Micro Controller Unit (MCU) 40 and a power control circuit 50. The power input port DC_IN is connected to the battery 20 or to an external adapter 60, and the power management module 30 is connected to the power input port DC_IN to receive a voltage.

The power control circuit 50 includes a first switch unit 501 and a second switch unit 502. The first switch unit 501 is connected between the power input port DC_IN and the MCU 40. In the embodiment, the first switch unit 501 includes a control terminal G, a first path terminal S, and a second path terminal D, the first path terminal S is connected to the power input port DC_IN, and the second path terminal D is connected to the MCU 40 through a voltage stabilizer 70. The second switch unit 502 is connected between the control terminal G of the first switch unit 501 and the MCU 40.

When the second switch unit 502 is manually placed in a first status by a user, the second switch unit 502 is configured for outputting a first control signal to switch on the first switch 501, to connect the MCU 40 to the power input port DC_IN for enabling the MCU 40 to receive power. The second switch unit 502 is further configured for outputting a boot signal to the MCU 40, and the MCU 40 outputs a power-on signal according to the boot signal to control the power management module 30 to power the electronic device 100.

When the second switch unit 502 is switched to a second status by the user, the second switch unit 502 is configured for outputting a shutdown signal to the MCU 40, and the MCU 40 outputs a power-off signal according to the shutdown signal, to control the power management module 30 to go through the shutdown procedure for the electronic device 100. The second switch module 502 is further configured for outputting a second control signal to switch off the first switch 501 after a determined period of time, to disconnect the MCU 40 from the power input port DC_IN, to cut off and not waste the input voltage from the power input port DC_IN to the MCU 40.

Figure 2:
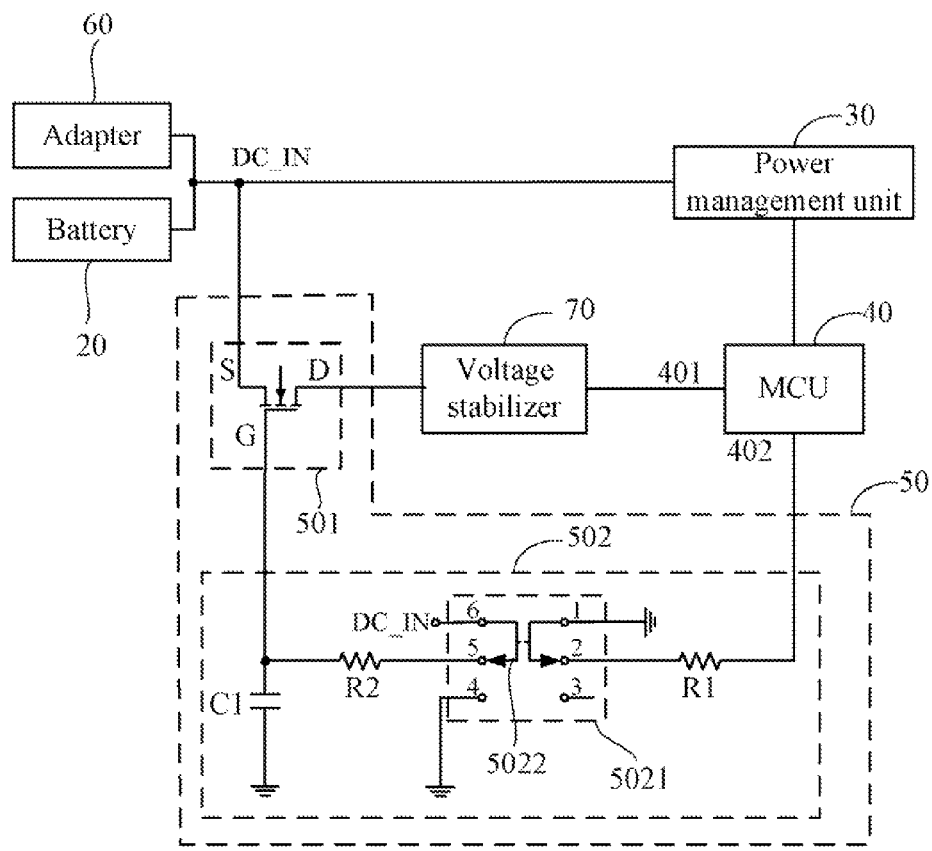
FIG. 2 is an exemplary circuit diagram of the electronic device of FIG. 1.

Specifically, referring to FIG. 2, in the embodiment, the first switch unit 501 is an N-channel Metal-Oxide-Semiconductor Field-Effect Transistor (NMOSFET), the gate, source, and drain of the NMOSFET constitute the control terminal G, the first path terminal S, and the second path terminal D respectively of the first switch unit 501, and the first switch unit 501 is switched on when the control terminal G is at a high voltage level.

The second switch unit 502 includes a slide switch 5021, the slide switch 5021 includes a conductive slider 5022 and a number of pins, 1~6, arranged in two opposite rows. In the embodiment, the first pin 1 is grounded, the sixth pin 6 opposite to the first pin 1 is connected to the power input port DC_IN; the second pin 2 is connected to a voltage detecting terminal 402 of the MCU 40 through a resistor R1, the fifth pin 5 opposite to the second pin 2 is connected to the control terminal G of the first switch unit 501 through a resistor R2, and is grounded through the resistor R2 and a capacitor C1; the third pin 3 is suspended, and the fourth pin 4 opposite to the third pin 3 is grounded.

In use, when the conductive slider 5022 is pushed into a first position, which is the first status of the second switch unit 502, the first pin 1 is connected to the second pin 2, and the fifth pin 5 is connected to the sixth pin 6. With that, the capacitor C1 is connected to the power input port DC_IN to be charged through the resistor R2, the first switch unit 501 is switched on with the control terminal G thereof being connected to the power input port DC_IN through the resistor R2 and at a high voltage level, and a voltage input terminal 401 of the MCU 40 obtains an input voltage from the power input port DC_IN through the first switch unit 501 and the voltage stabilizer 70, the MCU being then powered on. At the same time, the voltage detecting terminal 402 of the MCU 40 is grounded through the resistor R1 and at a low voltage level. The MCU 40 detects the low voltage level of the voltage detecting terminal 402, and outputs the power-on signal to control the power management module 30 to power the electronic device 100.

When the conductive slider 5022 is pushed into a second position while the electronic device 100 is on, which is the second status of the second switch unit 502, the second pin 2 is connected to the third pin 3, and the fourth pin 4 is connected to the fifth pin 5. With that, the voltage detecting terminal 402 of the MCU 40 is at a high voltage level. The MCU 40 detects the high voltage level of the voltage detecting terminal 402, and outputs the power-off signal to control the power management module 30 to begin shutdown of the electronic device 100. At the same time, the capacitor C1 discharges through the resistor R2 to lower the voltage level of the control terminal G of the first switch unit 501, and the first switch unit 501 is switched off after the determined period of time. As such, the MCU 40 is disconnected from the power input port DC_IN and the input voltage from the power input port DC_IN to the MCU 40 is cut off, the MCU 40 is then powered off.

Therefore, the electronic device 100 consumes zero power very quickly when users turn off the electronic device 100, which greatly reduces energy consumption and solves the problem of electronic device freezing and being isolated from a shutdown procedure when a MCU crashes.

The disclosure may be embodied in other forms without departing from the spirit thereof. Thus, the present examples and embodiments are to be considered in all respects as illustrative and not restrictive, and the disclosure is not to be limited to the details given herein.

What is claimed is:

1. An electronic device comprising:
    a power source;
    a power management module connected to the power source to receive a voltage;
    a MCU connected to the power management module; and
    a power control circuit comprising:
        a first switch unit connected between the power source and the MCU, wherein the first switch unit comprises a control terminal; and
        a second switch unit connected between the control terminal of the first switch unit and the MCU;
    wherein, the second switch unit has a first status in which the second switch unit outputs a first control signal to switch on the first switch, to connect the MCU to the power source for enabling the MCU to receive power; and the second switch unit further outputs a boot signal to the MCU, the MCU outputs a power-on signal according to the boot signal to control the power management module to power the electronic device;
    the second switch unit has a second status in which the second switch unit outputs a shutdown signal to the MCU, and the MCU outputs a power-off signal according to the shutdown signal, to control the power management module to go through the shutdown procedure for the electronic device; and the second switch module further outputs a second control signal to switch off the first switch after a determined period of time, to cut off an input voltage from the power source to the MCU.

2. The electronic device as described in claim 1, wherein the first switch unit is an NMOSFET, and the gate of the NMOSFET constitutes the control terminal of the first switch unit.

3. The electronic device as described in claim 2, wherein the second switch unit comprises a slide switch, the slide switch comprises a conductive slider and six pins arranged in two opposite rows, wherein the first pin is grounded, the sixth pin opposite to the first pin is connected to the power source; the second pin is connected to a voltage detecting terminal of the MCU, the fifth pin opposite to the second pin is connected to the control terminal of the first switch unit through a resistor, and is grounded through the resistor and a capacitor; the third pin is suspended, the fourth pin opposite to the third pin is grounded.

4. The electronic device as described in claim 3, wherein in the first status the conductive slider is pushed into a first position, the first pin is connected to the second pin, and the fifth pin is connected to the sixth pin, with that, the capacitor is connected to the power source to be charged through the resistor, the first switch unit is switched on with the control terminal thereof being connected to the power source through the resistor and at a high voltage level, and the MCU obtains an input voltage from the power source through the first switch unit and is then powered on; the voltage detecting terminal of the MCU is grounded and at a low voltage level, and the MCU outputs the power-on signal to control the power management module to power the electronic device according to the low voltage level.

5. The electronic device as described in claim 4, wherein in the second status the conductive slider is pushed into a second position, the second pin is connected to the third pin, and the fourth pin is connected to the fifth pin, with that, the voltage detecting terminal of the MCU is at a high voltage level, and the MCU outputs the power-off signal to control the power management module to begin shutdown of the electronic device according to the high voltage level; the capacitor discharges through the resistor to lower the voltage level of the control terminal of the first switch unit, and the first switch unit is switched off after the determined period of time, the input voltage from the power source to the MCU is cut off, and the MCU is then powered off.

6. A power control circuit employed in an electronic device, the electronic device comprising a power source, a power management module connected to the power source, and a MCU connected to the power management module; the power control circuit comprising:
    a first switch unit connected between the power source and the MCU, wherein the first switch unit comprises a control terminal; and
    a second switch unit connected between the control terminal of the first switch unit and the MCU;
    wherein, the second switch unit has a first status in which the second switch unit outputs a first control signal to switch on the first switch to connect the MCU to the power source for enabling the MCU to receive power; and the second switch unit further outputs a boot signal to the MCU, the MCU outputs a power-on signal according to the boot signal to control the power management module to power the electronic device;
    the second switch unit has a second status in which the second switch unit outputs a shutdown signal to the MCU, and the MCU outputs a power-off signal according to the shutdown signal to control the power management module to go through the shutdown procedure for the electronic device; and the second switch module further outputs a second control signal to switch off the first switch after a period of determined time, to cut off an input voltage from the power source to the MCU.

7. The power control circuit as described in claim 6, wherein the first switch unit is an NMOSFET, and the gate of the NMOSFET constitutes the control terminal of the first switch unit.

8. The power control circuit as described in claim 7, wherein the second switch unit comprises a slide switch, the slide switch comprises a conductive slider and six pins arranged in two opposite rows, wherein the first pin is grounded, the sixth pin opposite to the first pin is connected to the power source; the second pin is connected to a voltage detecting terminal of the MCU, the fifth pin opposite to the second pin is connected to the control terminal of the first switch unit through a resistor, and is grounded through the resistor and a capacitor; the third pin is suspended, the fourth pin opposite to the third pin is grounded.

9. The power control circuit as described in claim 8, wherein in the first status the conductive slider is pushed into a first position, the first pin is connected to the second pin, and the fifth pin is connected to the sixth pin, with that, the capacitor is connected to the power source to be charged through the resistor, the first switch unit is switched on with the control terminal thereof being connected to the power source through the resistor and at a high voltage level, and the MCU obtains an input voltage from the power source through the first switch unit and is then powered on; the voltage detecting terminal of the MCU is grounded and at a low voltage level, and the MCU outputs the power-on signal to control the power management module to power the electronic device according to the low voltage level.

10. The power control circuit as described in claim 9, wherein in the second status the conductive slider is pushed into a second position, the second pin is connected to the third pin, and the fourth pin is connected to the fifth pin, with that, the voltage detecting terminal of the MCU is at a high voltage level, and the MCU outputs the power-off signal to control the power management module to begin shutdown of the electronic device according to the high voltage level; the capacitor discharges through the resistor to lower the voltage level of the control terminal of the first switch unit, and the first switch unit is switched off after the determined period of time, the input voltage from the power source to the MCU is cut off, and the MCU is then powered off.

* * * * *